Patented Apr. 20, 1937

2,077,640

UNITED STATES PATENT OFFICE 2,077,640

PHENOLIC RESINS AND METHOD OF MAKING THE SAME

Frederick M. Murdock, Chicopee Falls, and Charles S. Webber, Springfield, Mass., assignors to The Fiberloid Corporation, Indian Orchard, Mass., a corporation of Massachusetts No Drawing. Application July 31, 1934, Serial No. 737,767

2 Claims. (Cl. 260—4)

The present invention relates to the manufacture of phenolic resins or condensation products made by the reaction of a phenolic body and an aldehyde and particularly to certain improvements in the production of transparent, translucent or opaque white resins, and in preventing discoloration due at least in part or in some circumstances to the oxidization of the alkaline phenolic aldehyde mixture during the initial reaction.

In a companion application filed by Charles S. Webber, dated July 31, 1934, Serial No. 737,763, there is described and claimed the employment of a phenolic resin which is rendered translucent or opaque by the presence in the final product of an alkaline salt of certain acids, particularly malic acid. The present invention is based on the discovery that certain beneficial results are obtained and better resins are produced irrespective of whether they are transparent, translucent or opaque if during the initial reaction there is present in addition to the usual alkaline catalyst a soluble salt of one or more of the group of acids which includes lactic, glycolic, malic, maleic, alpha-hydroxy-iso-butyric, malonic, tartaric, citric, mucic, hydracrylic, oxalic, mandelic, phthalic, and benzoic. While in actual practice we form this salt in the reaction mixture by the addition of the acid to the mixture in an amount sufficient to combine with only a portion of the alkaline catalyst employed, and prefer to employ an alkaline carbonate, since by so doing carbon dioxide is generated which tends to free the reaction materials from dissolved or included air, it is not essential that this procedure be followed since valuable results are also obtained by the introduction of the already formed salt into the mixture.

We have employed herein the phrase "initial reaction" to designate that part of the procedure of producing phenolic resin which takes place while the phenolic body and the aldehyde are reacting in the presence of a catalyst and before any steps are taken to remove the volatile products of the reaction.

One preferred form of practicing the invention will now be described. A mixture is formed of about 100 parts of phenol and between approximately 85 to 425 parts of formaldehyde, the molecular proportion of these mixtures ranging from 1 to 5 molecules of formaldehyde to 1 of phenol. The proportion of the formaldehyde is based on the use of a 37% solution. For the production of a water white or substantially water white resin, it is essential that pure or substantially pure materials be employed. The mixture is placed in a suitable vacum kettle and from 1 to 5 parts of an alkaline hydroxide is added, 3.3 parts being a convenient amount. To the mixture is also added sufficient lactic acid to neutralize about $\frac{1}{10}$ of the alkaline hydroxide employed. When 3.3 parts of sodium hydroxide are used, 1 part of 85% lactic acid is sufficient. The amount of lactic acid to be added should be sufficient to neutralize only a part of the alkaline hydroxide, it being essential to leave sufficient unneutralized hydroxide to promote the reaction. In practice we neutralize about $\frac{1}{10}$ of the alkaline hydroxide. The air is then exhausted from the kettle and as high a vacuum as conveniently possible is produced. The vacuum pump is then shut off but the air is not readmitted. Heat being applied and the temperature of the reaction mixture having risen a few degrees, the reaction chamber is again exhausted to remove further traces of air and the vacuum line is shut off again. If necessary this operation may be repeated. The heating of the reaction mixture is continued while the air is still excluded and the vacuum line is shut off. The temperature at which the reaction is carried out may be varied within wide limits. It has been found desirable, however, to conduct the reaction between 70 and 120° C. but it is possible to carry out the reaction at temperatures outside this range. If the reaction is carried out at temperatures in the upper part of the temperature range given, the pressures in the chamber due to presence of vapors from the reaction mixture may be higher than atmospheric. The duration of the heating depends, of course, upon several factors, one of which is the reaction temperature. In practice it has been found that the various factors may be regulated so that the duration of the initial reaction need not exceed four hours once the mixture has reached the reaction temperature. After the initial reaction has been completed, additional lactic acid is added, namely, from 1 to 10 parts and, if desired, a softener, for instance, from 5 to 35 parts of glycerine. Preferably the lactic acid and the softener used are introduced by pulling them into the machine by means of a vacuum device associated with the vacuum kettle. In this way the entrance of air is prevented.

Thereafter the reaction is continued and volatile constituents of the mixture may be removed in the ordinary way, that is, by heating while the vacuum is maintained. The final mixture can be cast, cured or otherwise treated in accordance with the well understood procedure.

A particular formula which can be employed in practicing our invention is as follows:

Phenol 100 parts; formaldehyde (37%) 258 parts; sodium hydroxide 3.3 parts; and lactic acid (85%) 1 part. The initial reaction is carried on for about two hours at temperatures of between 70 and 80°C. Thereafter the mixture is neutralized with 8.5 parts of lactic acid and such softeners as required are added. The reaction is then continued until the volatile constituents are removed in the ordinary way, that is, by heating while the vacuum is maintained. The resin thus produced is a clear transparent resin.

A formula in which malic acid and sodium carbonate are employed in practicing my invention is as follows:

Phenol 100 parts; formaldehyde (37%) 258 parts; sodium carbonate 4.4 parts; and malic acid 0.6 part. The initial reaction is carried on for about two hours at temperatures between 70 and 80° C. Thereafter, the mixture is neutralized with 5.4 parts of malic acid and such softeners as required are added. Thereafter the reaction is continued until the volatile constituent is removed in the ordinary way, that is, by heating while the vacuum is maintained. The resin produced is a white opaque resin.

In general one or more of the following acids may be used to neutralize the catalyst: lactic, glycolic, malic, maleic, alpha-hydroxy-iso-butyric, malonic tartaric, citric, mucic, hydracrylic, oxalic, mandelic, phthalic, benzoic and phosphoric. Certain of these are organic acids containing both hydroxyl and carboxyl groups, all of which are useful for the purpose in question.

We claim:

1. The method of producing phenol-aldehyde resins which consists in carrying on the initial reaction between a phenol and an aldehyde in the presence of an alkaline catalyst and sufficient lactic acid to neutralize only a portion thereof and after the initial reaction is completed adding a slight excess of lactic acid over the amount theoretically required to complete the neutralization of the catalyst.

2. The method of producing phenolic-aldehyde resins which consists in carrying on the initial reaction between a phenol and an aldehyde in the presence of an alkaline catalyst and a soluble salt of lactic acid and after the initial reaction is completed adding a slight excess of lactic acid over the amount theoretically required to complete the neutralization of the catalyst.

FREDERICK M. MURDOCK.
CHARLES S. WEBBER.